(12) United States Patent
Adams

(10) Patent No.: US 6,547,511 B1
(45) Date of Patent: Apr. 15, 2003

(54) PROCESS OF LOADING ROLLS OF ROOFING MATERIAL ONTO A PALLET

(75) Inventor: Paul S. Adams, Saline, MI (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 23 days.

(21) Appl. No.: 09/702,108

(22) Filed: Oct. 30, 2000

(51) Int. Cl.$^7$ ................................................ B66F 11/00
(52) U.S. Cl. .................. 414/746.4; 414/911; 414/789.2
(58) Field of Search ............... 414/799, 789.2, 414/789.8, 746.4, 755.2, 911; 53/148, 542, 544

(56) References Cited

U.S. PATENT DOCUMENTS

| | | | |
|---|---|---|---|
| 9,617 A | * | 3/1853 | Gleason ..................... 100/116 |
| 523,609 A | | 7/1894 | Wadley |
| 1,719,197 A | | 7/1929 | Schlothan |
| 1,733,459 A | | 10/1929 | Hooper et al. |
| 2,508,698 A | | 5/1950 | Von Beren |
| 2,846,098 A | | 8/1958 | Kopp |
| 3,436,895 A | | 4/1969 | Pearne et al. |
| 3,627,147 A | | 12/1971 | Yowell et al. |
| 3,717,263 A | * | 2/1973 | McWilliams ................. 198/317 |
| 3,831,782 A | * | 8/1974 | Werntz ........................ 198/412 |
| 4,124,127 A | | 11/1978 | Vevang |
| 4,178,122 A | | 12/1979 | Abrahamson |
| 4,610,592 A | | 9/1986 | Pienta |
| 4,613,032 A | * | 9/1986 | Berger et al. ................. 198/409 |
| 4,874,078 A | | 10/1989 | Meyer |
| 4,941,798 A | | 7/1990 | Meier |
| 5,332,351 A | | 7/1994 | Nelson et al. |
| 5,341,911 A | | 8/1994 | Gamberini et al. |
| 5,580,205 A | * | 12/1996 | Frystak ........................ 242/557 |
| 5,630,780 A | | 5/1997 | Crowley |
| 6,033,172 A | * | 3/2000 | Simon ........................ 414/24.5 |
| 6,059,520 A | * | 5/2000 | Adams et al. ............... 414/800 |
| 6,152,670 A | * | 11/2000 | Onnerlov ..................... 193/27 |

* cited by examiner

*Primary Examiner*—Eileen D. Lillis
*Assistant Examiner*—Michael J. Kwon
(74) *Attorney, Agent, or Firm*—Inger H. Eckert; James J. Dottavio; Maria C. Gasaway

(57) ABSTRACT

An apparatus and process of loading rolls of roofing material onto a stationary pallet, wherein the process performs a series of operations, in accordance with the present invention. Each operation includes the steps of: (a) loading rolls of roofing material onto an upwardly inclined conveyor; (b) depositing the rolls of roofing material onto a downwardly inclined-table; (c) dropping the rolls of roofing material onto a sloped, rotating table until the desired number of rolls of roofing material are accumulated; (d) rotating the table and then tilting the plate until it is nearly upright into a vertical position; (e) traversing the rotating table over the pallet conveyor; and (f) unloading the roll of roofing material from the rotating table onto the pallet.

15 Claims, 6 Drawing Sheets

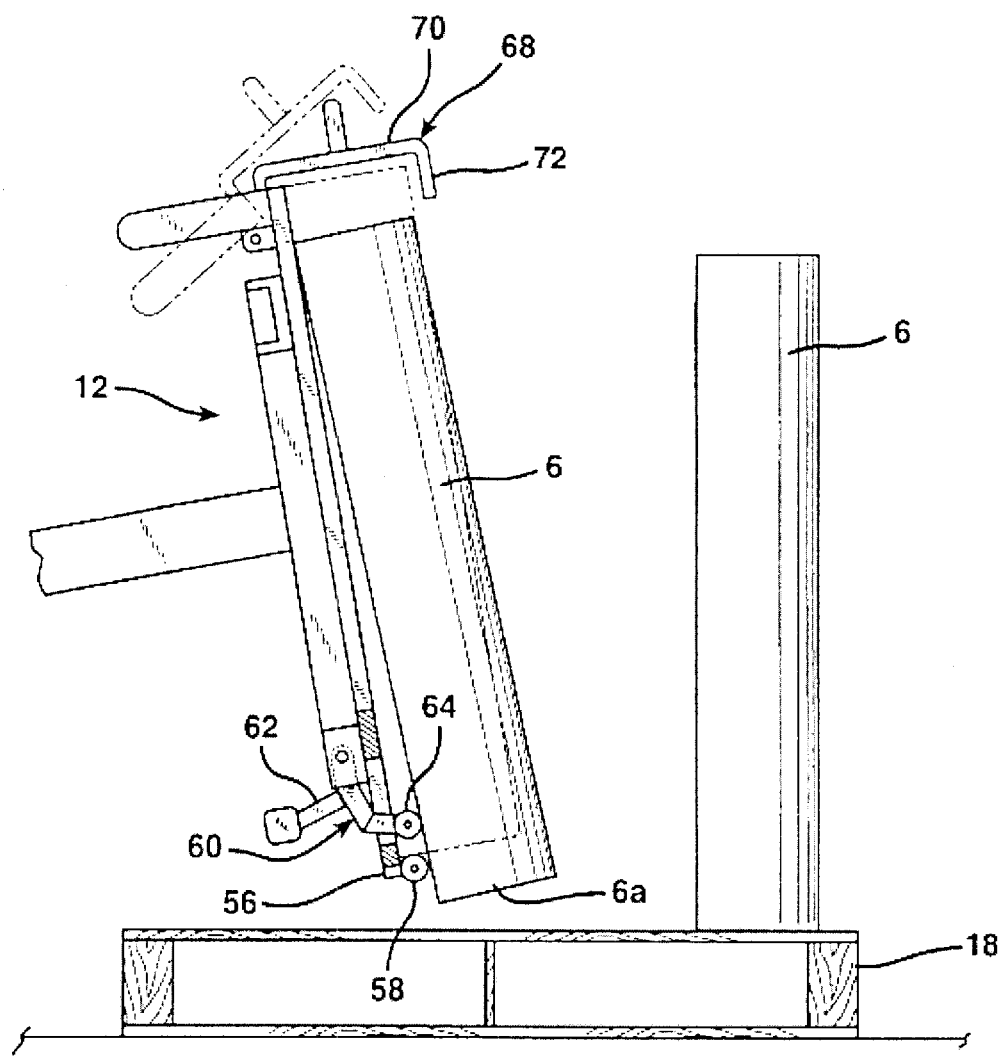

PROCESS OF LOADING ROLLS OF ROOFING MATERIAL ONTO A PALLET

TECHNICAL FIELD AND INDUSTRIAL APPLICABILITY OF THE INVENTION

This invention relates to a process of handling rolls of roofing material and stacking the rolls of roofing material onto a shipping pallet.

BACKGROUND OF THE INVENTION

Rolled roofing material is generally made of a glass fiber reinforced asphalt matrix with protective granules coated on one of the surfaces. The rolled roofing material is manufactured in long sheets which are then rolled for ease of handling and transporting. The sheets of rolled roofing material are typically manufactured in 3-foot wide sheets and then rolled by a roll-up machine to a diameter of about 9 inches. The rolls of roofing material exit the roll-up machine on a conveyor and are typically oriented in a horizontal position. A plurality of rolls of roofing material are then "palletized" or loaded onto a shipping pallet for storage and transportation. The rolls of roofing material are placed vertically on the pallet such that they stand on end. The plurality of rolls of roofing material on the pallet are then often banded together for stability on the pallet.

In the past, the rolls of roofing material were palletized by workers manually lifting each roll from the conveyor and placing them on the pallet. However, the rolls of roofing material are relatively heavy and can weigh around 36.3 kg (80 lbs.) each. Therefore, the rolls of roofing material are cumbersome to manually handle. Manually lifting each roll is also labor intensive and time consuming.

For these reasons, automated upender machines or "upenders" have been used to palletize the rolls of roofing material. Automated upenders typically include a platform or table for receiving a plurality of horizontally oriented rolls of roofing material from the conveyor. For a conventionally sized pallet, four or five rolls of roofing material in a linear arrangement can be loaded at a time onto the table. The rolls of roofing material are loaded onto the table by automated actuator arms which push the rolls of roofing material from the conveyor onto the table. After the rolls of roofing material are loaded on the table, the table is pivoted to a first vertical position by a pneumatic or hydraulic cylinder. The rolls of roofing material are supported by a bottom ledge extending from the table. A pair of movable side plates positioned adjacent the outermost rolls of roofing material are moved by actuators so as sandwich the plurality of rolls of roofing material. The side plates help prevent the rolls of roofing material from moving or shifting when pivoted from the horizontal position to the first vertical position. Additional actuators then translationally move the table in a horizontal direction to a second vertical position above a pallet. The ledge is then retracted by actuators, thereby dropping the rolls of roofing material onto the pallet.

The table is then moved back to the conveyor to load another batch of rolls of roofing material. The table is moved from the first vertical position to the second position by the same distance every time. Therefore, the pallet must be moved or indexed so that the next load of rolls of roofing material is properly positioned on the pallet adjacent the previously load of rolls of roofing material. To accomplish this task, the pallet is connected to an automated indexing machine which automatically re-positions the pallet after every load of rolls of roofing material. Although the automated upender and the pallet-indexing machine perform satisfactorily, the automated machines are very costly to manufacture and maintain. The automated upender and indexing machine can also occupy a large quantity of floor space.

It is an object of the present invention to provide a method of palletizing rolls of roofing material that eliminates the need for manual product orientation.

It is another object of the present invention to provide a method of palletizing rolls of roofing material which includes two alternative rotation configurations for orienting rows of rolls of roofing material.

It is an object of the present invention to provide a method of palletizing rolls of roofing material which is relatively inexpensive and highly reliable.

SUMMARY OF THE INVENTION

The above objects as well as other objects not specifically enumerated are achieved by a process of loading rolls of roofing material onto a stationary pallet, wherein the process performs a series of operations, in accordance with the present invention. Each operation includes the steps of: (a) loading rolls of roofing material onto an upwardly inclined conveyor; (b) depositing the rolls of roofing material onto a downwardly inclined table; (c) dropping the rolls of roofing material onto a sloped, rotating table until the desired number of rolls of roofing material are accumulated; (d) rotating the table and then tilting the plate until it is nearly upright into a vertical position; (e) traversing the rotating table over the pallet conveyor; and (f) unloading the roll of roofing material from the rotating table onto the pallet. The pallet is positioned stationary relative to the loading position of the rotational table throughout the process.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a side view of the rotated accumulator table of FIG. 1.

DETAILED DESCRIPTION AND PREFERRED EMBODIMENTS OF THE INVENTION

Figure 1:
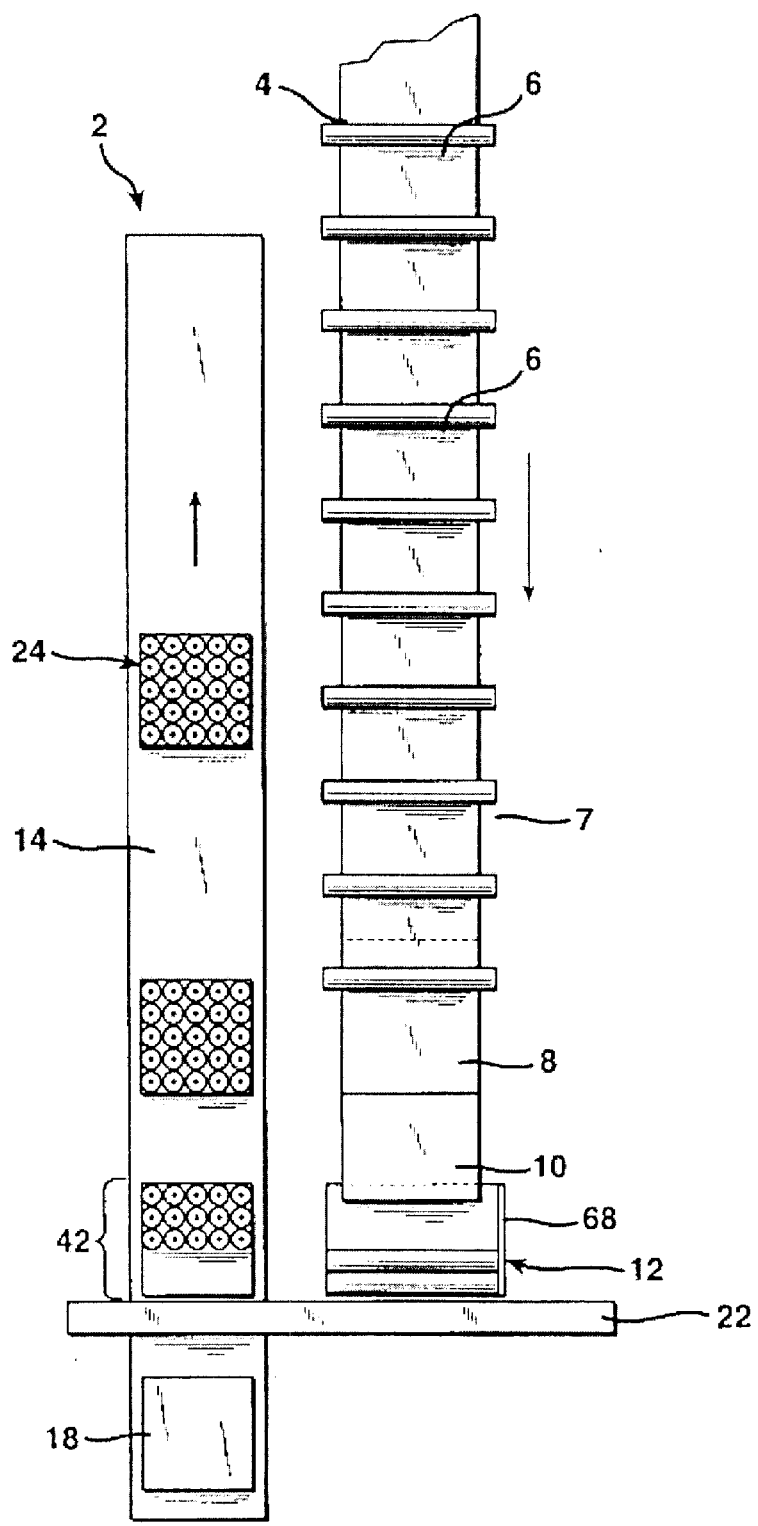
FIG. 1 is a top view of a conveyor system and accumulator table according to the present invention.
Figure 1A:
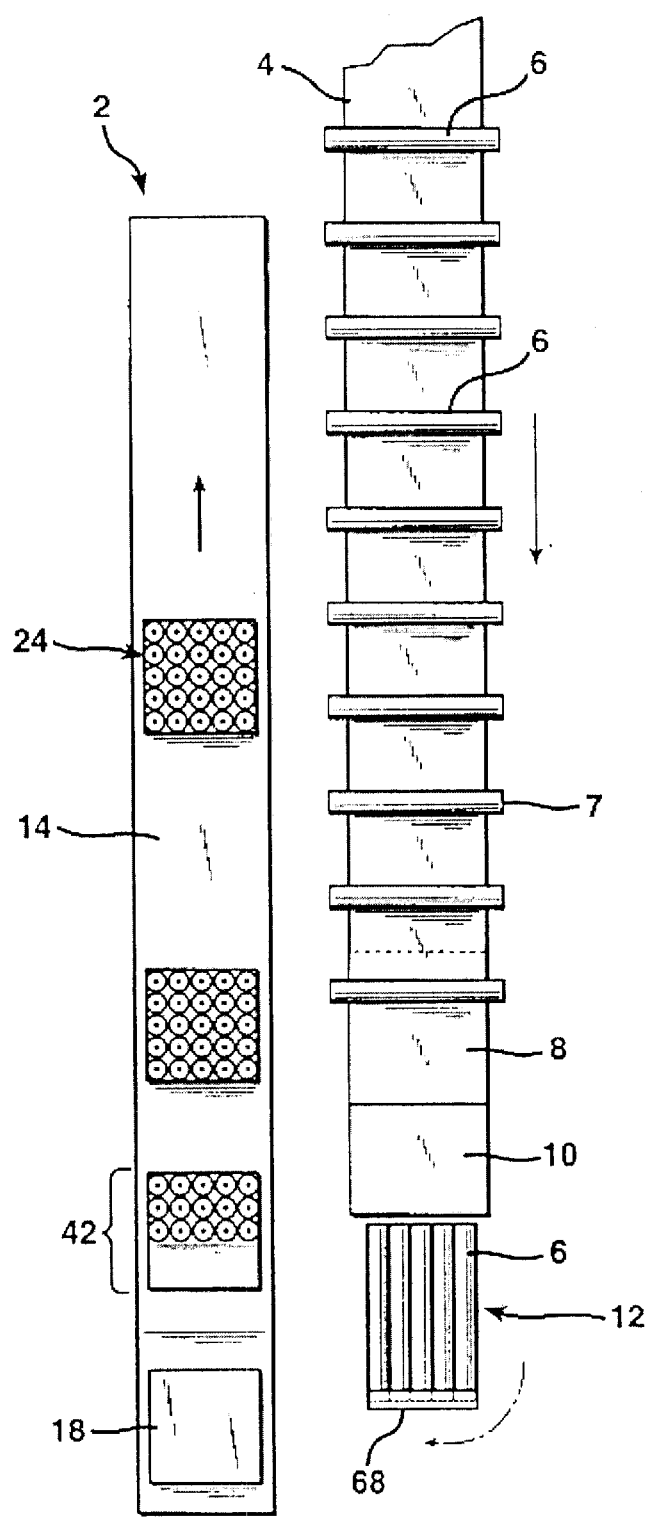
Figure 2:
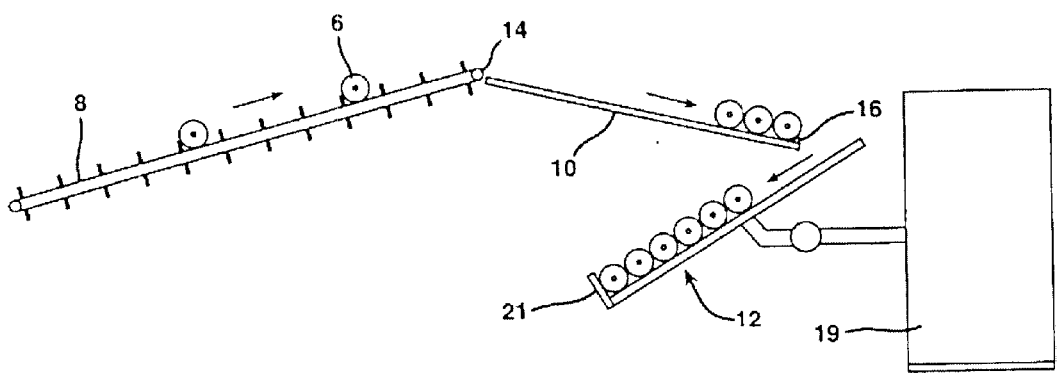
FIG. 2 is a side view of the inclined conveyor system and the accumulator table shown in FIG. 1.

Referring now to the drawings, in FIG. 1 the palletizer conveyor system 2 is illustrated. The conveyor system 2 includes a supply conveyor 4 for supplying a stock of rolls of roofing material 6. Rolls of roofing material 6 are transported to inclined conveyor 8 where they are moved, on an upward incline, to table 10. FIG. 2 illustrates the upward incline of conveyor 8 and the downward incline of table 10. As rolls of roofing material 6 reach the end 14 of inclined conveyor 8, they roll downwardly on sloping table 10 through gravitational pull. A stopping mechanism 16 prevents the rolls of roofing material 6 from dropping off of the table 10. Once the desired number of rolls of roofing material, typically five or six rolls of roofing material, accumulate on the table 10, the stopping mechanism 16 releases and the rolls of roofing material are dropped onto accumulator table 12. In another embodiment of the invention, the downwardly sloping table 10 may be eliminated and the rolls of roofing material 6 drop directly from inclined conveyor 8 to the accumulator table 12. Ledge 18 prevents the rolls of roofing material 6 from dropping off of the accumulator table 12.

Figure 4A:
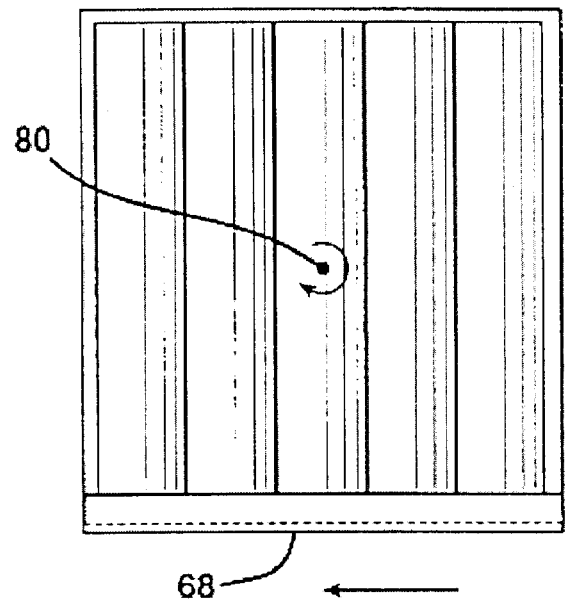
FIG. 4A is a top view of a first embodiment of an accumulator table in the vertical position.

As shown in FIGS. 1 and 4A, rolls of roofing material 6 are loaded onto accumulator table 12 in parallel arrangement with; the rolls of roofing material on the supply conveyor 4. After all of the rolls of roofing material 6 have dropped from table 10 on to accumulator table 12 support member 20 is lowered over the ends 7 of the rolls of roofing material to secure the rolls of roofing material 6, as shown in FIG. 4A. Accumulator table 12 rotates 90° clockwise, as viewed in FIG. 4A, until the rolls of roofing material 6 on the accumulator table 12 are perpendicular with the rolls of roofing material on the supply conveyor 4.

As shown in FIG. 3, accumulator table 12 tilts vertically upright into the unloading position where the rolls of roofing material 6 stand on end in a generally vertical position. The accumulator table 12 traverses laterally over the conveyor 14 to the unloading area 42. Once the accumulator table 12 is properly positioned at the desired unloading position, as shown in FIG. 3, the lever arm 62 of the lever mechanism 60 is depressed, thereby moving the pusher bar 64 forward or rightward in a counter clockwise direction, as viewing FIG. 3. Movement of the pusher bar 34 pushes a bottom portion 6a of the rolls of roofing material 6 beyond the roller 58 of the ledge 56, thereby dropping or unloading the rolls of roofing material 6 onto the pallet 18, as shown in FIG. 3.

After the first batch of rolls of roofing material 6 have been unloaded onto the pallet 40, the accumulator table 12 can be moved back to its loading position, as illustrated in FIG. 1. Another batch of rolls of roofing material is then loaded onto the accumulator table 12 until the pallet is full. Once the pallet is full, the conveyor 14 transports the pallet containing rolls of roofing material 6 away from the unloading area 42 and the above process is repeated. The above apparatus and process may comprise that described in that of commonly assigned U.S. Pat. No. 6,059,520 which is herein incorporated by reference in its entirety ('520 patent).

The accumulator table 12I of the present invention is rotatably mounted to a frame 19 as shown in FIG. 2. The accumulator table 12 may be mounted to the stationary frame 19 by a mechanical arm or may be mounted to a frame on rollers as depicted in the '520 patent. The movement of the accumulator table 12 may be operated manually or through the use of robotics.

Figure 4B:
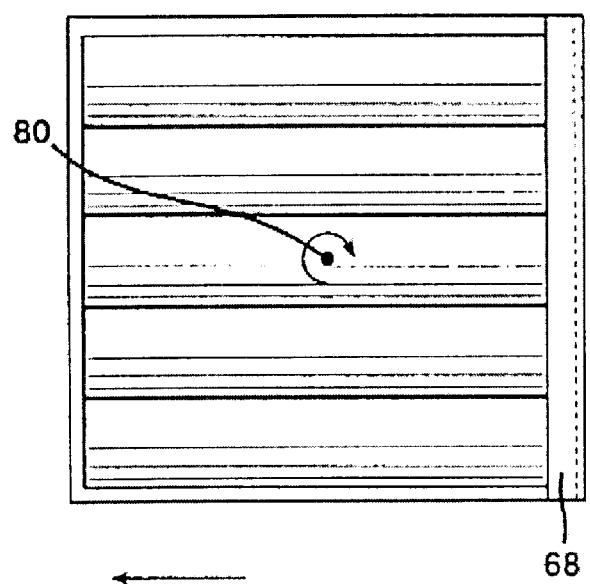
FIG. 4B is a top view of a first embodiment of an accumulator table the horizontal position.
Figure 5A:
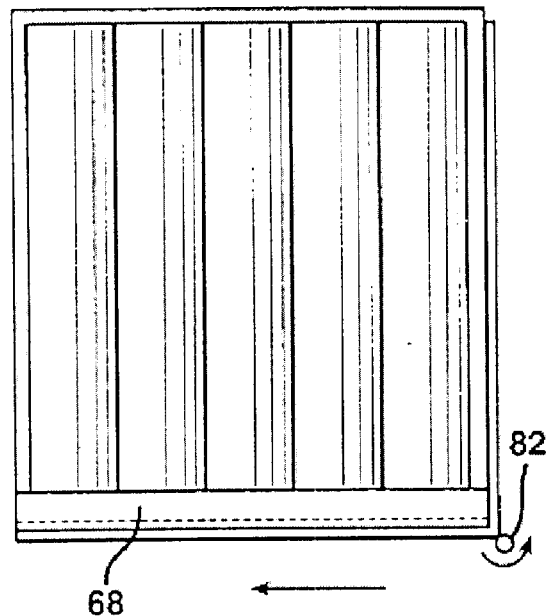
FIG. 5A is a top view of a second embodiment of an accumulator table in the vertical position.
Figure 5B:
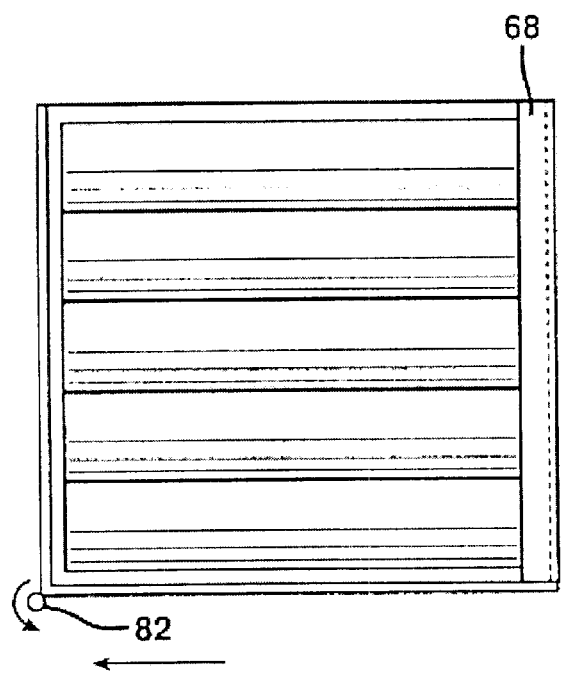
FIG. 5B is a top view of a second embodiment of an accumulator table in the horizontal position.

The accumulator table 12 may contain a central pivot axis 80 as shown in FIGS. 4A and 4B or a corner pivot axis 82 as shown in FIGS. 5A and 5B. In a second embodiment, as shown in FIGS. 4A and 4B, the accumulator table 12 contains a central pivot axis 80, the accumulator plate 12 rotates, tilts and then traverses over the pallet 40 in the unloading process. In a third embodiment, as shown in FIGS. 5A and 5B, the accumulator table 12 contains a corner pivot 82 and the accumulator table 12 simultaneously rotates and tilts over the pallet 40 for unloading.

As shown in FIG. 3, accumulator table 12 has a ledge 56 extending from an end thereof and supports the rolls of roofing material 6 when the accumulator table 12 is in the generally vertical position. Preferably, the ledge 56 includes a roller 58 to assist in removing the rolls of roofing material 6 at the appropriate time and position. The roller enables the rolls of roofing material 6 to roll off the ledge 56, thereby helping to prevent tearing of the bottom edge 6a of the rolls of roofing material 6. To assist in manually unloading the rolls of roofing material 6 off the ledge 56 and onto the associated pallet 18, the accumulator table 12 preferably includes a lever mechanism, indicated generally at 60. The lever mechanism 60 is pivotally attached to the accumulator table 12. The lever mechanism 60 includes a lever arm 62 and a pusher bar 64.

Preferably, the accumulator table 12 includes a support member, indicated generally at 68, for preventing the rolls of roofing material 6 from tipping in a direction away from the accumulator table 12 when the rolls of roofing material 6 are in their generally vertical position. The support member 68 includes a plate 70 extending from an edge of the accumulator table 12 and positioned above the rolls of roofing material 6 when the rolls of roofing material 6 are in their generally vertical position. A lip 72 extends from an edge of the plate 70. The unattached end of the lip 72 is positioned so that if a roll of roofing material 6 were to tip in a clockwise direction, as viewing FIG. 3, the upper portion of the roll of roofing material 6 will catch on the lip 72, thereby preventing the roll of roofing material 6 from tipping completely over in a direction away from the accumulator table 12. Alternatively, the distance between the ledge 56 and the plate 70 can be just slightly larger than the length of the rolls of roofing material 6 so that the plate 70 would prevent the roll of roofing material 6 from tipping in an arcuate path, thereby eliminating the need for the lip 72. Preferably, the support member 68 is pivotally attached to the table 38 so that the support member 68 can be pivoted upwardly as needed, as shown in phantom lines in FIG. 3.

The principle and mode of operation of this invention have been described in its preferred embodiments. However, it should be noted that this invention may be practiced otherwise than as specifically illustrated and described without departing from its scope.

What is claimed is:

1. A process for loading rolls of roofing material onto a stationary pallet, wherein the process performs a series of operations, each operation comprising the steps of:

(a) depositing a roll of roofing material onto a downwardly sloping first table;

(b) dropping said roll of roofing material from said first table onto an upwardly sloping second table adjacent to said first table;

(c) rotating said second table 90° within a plane defined by an upper surface of said second table;

(d) tilting said second table to an unloading position where said plane is oriented substantially upright;

(e) unloading the roll of roofing material from said second table onto said pallet, wherein the pallet is positioned stationary relative to the loading position of said second table throughout the process.

2. The process of claim 1, wherein step (a) comprises loading a plurality of rolls of roofing material onto said first table in a juxtaposed position, step (b) comprises dropping a plurality of rolls of roofing material, and step (e) comprises unloading a plurality of rolls of roofing material.

3. The process of claim 1, wherein said first table comprises a retractable stopping mechanism.

4. The process of claim 1, wherein of the roll of roofing material is restrained during steps (c) and (d), thereby preventing the roll of roofing material from tipping in a direction away from the second table.

5. The process of claim 4, wherein the roll of roofing material is restrained by a support member mounted on said second table and positioned above said roll of roofing material when said roll of roofing material is in a substantially vertical position.

6. The process of claim 1, wherein the roll of roofing material is unloaded in step (e) by pushing a bottom portion of the roll of roofing material beyond a ledge mounted on said second table for supporting the plurality of rolls of roofing material in said vertical position.

7. The process of claim 6, wherein the roll of roofing material is unloaded in step (e) by rotating a lever mechanism pivotally mounted on the table, wherein rotation causes the lever mechanism to push a bottom portion of the roll of roofing material beyond the ledge.

8. The process of claim 6, wherein the roll of roofing material is unloaded in step (e) by pushing a bottom portion of the roll of roofing material along a roller rotatably mounted on the ledge.

9. An apparatus for loading rolls of roofing material onto a stationary pallet, the apparatus comprising:
   (a) an upwardly inclined conveyor extending from a supply conveyor for supplying rolls of roofing material thereon;
   (b) a first downwardly sloping table for receiving said rolls of roofing material from said upwardly inclined conveyor;
   (c) an upwardly sloping second table adjacent to said first table;
   (d) a stop extending from said second table for supporting rolls of roofing material when oriented in a sloped position; and
   (e) a support member extending from said second table wherein a first plane is defined by an upper surface of said second table and when said first plane is oriented in a substantially upright position said support member prevents rolls of roofing material from tipping in a direction away from the second table.

10. The apparatus of claim 9, wherein the support member includes a plate positioned contiguous to the upper surface edge of the second table, the plate defining a second plane which is generally perpendicular to said first plane defined by an upper surface of the table.

11. The apparatus of claim 9, wherein the support member includes a lip extending from the plate in a direction generally parallel to the upper surface of the second table.

12. The apparatus of claim 9, wherein the ledge has a roller rotatably mounted thereon.

13. The apparatus of claim 9, further including a lever mechanism pivotally mounted on the second table, the lever mechanism having a pusher bar movable to a position extending through a slot formed in the second table to push a bottom portion of rolls of roofing material past the ledge.

14. The apparatus of claim 9, wherein said downwardly sloping first table comprises a first end and a second end.

15. The apparatus of claim 14, wherein said second end of said downwardly sloping first table comprises a stop plate.

* * * * *